(12) United States Patent
DiGiovanna

(10) Patent No.: US 12,045,688 B2
(45) Date of Patent: Jul. 23, 2024

(54) TRACKING A BARCODE SCANNER USING A BLE BEACON RECEIVER CONTAINED WITHIN A READER

(71) Applicant: ZEBRA TECHNOLOGIES CORPORATION, Lincolnshire, IL (US)

(72) Inventor: Robert W. DiGiovanna, Shirley, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/989,204

(22) Filed: Nov. 17, 2022

(65) Prior Publication Data
US 2024/0169170 A1    May 23, 2024

(51) Int. Cl.
*G06K 7/14* (2006.01)
(52) U.S. Cl.
CPC ................. *G06K 7/1413* (2013.01)
(58) Field of Classification Search
CPC .... G06K 7/1413; G06K 7/1417; G06K 7/109; G06K 7/10386
USPC .......... 235/462.01, 454, 375, 472.03, 462.14
See application file for complete search history.

(56) References Cited

U.S. PATENT DOCUMENTS

| 9,473,941 | B1 * | 10/2016 | Palin ................... H04W 12/069 |
| 9,892,351 | B2 | 2/2018 | Connolly et al. |
| 10,039,057 | B1 | 7/2018 | Lam et al. |
| 2015/0281877 | A1 * | 10/2015 | Walden ................... H04W 4/80 455/41.2 |
| 2017/0140350 | A1 * | 5/2017 | Jamkhedkar ....... G06Q 20/3821 |
| 2017/0180916 | A1 | 6/2017 | Jakusovszky et al. |
| 2020/0042752 | A1 | 2/2020 | Tourdot et al. |
| 2022/0283849 | A1 * | 9/2022 | Miller ............... H04M 1/72412 |
| 2023/0075414 | A1 | 3/2023 | Harris et al. |

FOREIGN PATENT DOCUMENTS

EP    3382657 A1 * 10/2018 ............... G07C 9/10

OTHER PUBLICATIONS

International Search Report and Written Opinion for International Application No. PCT/US2023/34558 mailed on Feb. 28, 2024.

* cited by examiner

*Primary Examiner* — Edwyn Labaze

(57) ABSTRACT

A system includes a reader having a first Bluetooth Low Energy (BLE) device and a barcode scanner having a second BLE device. The first BLE device includes a first advertiser and a first listener, and the second BLE device includes a second advertiser and a second listener. The first advertiser of the reader is configured to broadcast a first beacon signal. The barcode scanner is configured to: detect, by the second listener, the first beacon signal and in response to detecting the first beacon signal, generate an alarm.

16 Claims, 3 Drawing Sheets

TRACKING A BARCODE SCANNER USING A BLE BEACON RECEIVER CONTAINED WITHIN A READER

BACKGROUND

Devices (e.g., barcode scanners) are used in a variety of applications, including in retail applications and in inventory and other industrial applications. Recently, the use of cordless barcode scanners has increased in these applications (e.g., at self-checkout registers). However, cordless barcode scanners can be challenging to track and are susceptible to being lost or stolen.

SUMMARY

The present disclosure provides new and innovative systems and methods for tracking barcode scanners using a (BLE) beacon receiver (listener) contained within a reader. An example system includes a reader having a first Bluetooth Low Energy (BLE) device and a barcode scanner having a second BLE device. The first BLE device includes a first advertiser and a first listener, and the second BLE device includes a second advertiser and a second listener. The first advertiser of the reader is configured to broadcast a first beacon signal. The barcode scanner is configured to detect, by the second listener, the first beacon signal and in response to detecting the first beacon signal, generate an alarm.

An example method includes broadcasting, by a first advertiser of a reader, a first beacon signal, detecting, by a second listener of a barcode scanner, the first beacon signal, and in response to detecting the first beacon signal, generating, by the barcode scanner, an alarm. The reader includes a first Bluetooth Low Energy (BLE) device having the first advertiser and a first listener, and the barcode scanner includes a second BLE device having a second advertiser and the second listener.

Additional features and advantages of the disclosed system and method are described in, and will be apparent from, the following Detailed Description and the Figures.

DETAILED DESCRIPTION OF EXAMPLE EMBODIMENTS

Described herein are systems and methods for tracking barcode scanners using a BLE beacon receiver (listener) contained within a reader. A (cordless) barcode scanner may be used in various stores and commercial premises (e.g., grocery stores, hardware stores, book stores, etc.). However, a barcode scanner can be intentionally or unintentionally carried away by a customer using a self-checkout register. One way to address this issue is to utilize a technique where an alarm is generated from the barcode scanner when the barcode scanner is out of range from a base station (e.g., cradle) to/with which the barcode scanner is connected/paired.

This approach may have several drawbacks. First, the loss of power to the base station may cause a loss of connection between the base station and the corresponding barcode scanner, which may generate a false alarm. This may occur during power outages or when a point of sale (POS) system (to which the base station is connected) is shutdown, or if a power cable of the base station is intentionally or unintentionally unplugged. Second, interference from other devices (e.g., cell phones using 2.4 Ghz) can cause the loss of connection between the base station and the corresponding barcode scanner, which may also generate a false alarm. This may occur more frequently as the transmit power is lowered to reduce the alarm distance. Third, a radio frequency (RF) signal between the barcode scanner and the base station may be blocked by a human body (e.g., a customer's body) or a large object therebetween, which may also cause a false alarm. A high frequency of false alarms can increase a likelihood that individuals (e.g., security officers) may ignore the alarms and thereby increase the risk of a barcode scanner being lost or stolen.

Aspects of the present disclosure address the above-discussed issues. For example, the system according to the present disclosure may include a reader having a first BLE device, and a barcode scanner having a second BLE device. The reader may be located near an entrance and/or exit of a store and/or commercial premise. An advertiser of the first BLE device may be configured to broadcast a first beacon signal. When the barcode scanner detects, by a listener of the second BLE device, the first beacon signal, the barcode scanner may generate an alarm (e.g., a sound signal). In this way, aspects of the present disclosure allow the system to utilize positive feedback (detection of a beacon signal) instead of negative feedback (e.g., loss of a connection), which may reduce or eliminate false alarms.

Figure 1:
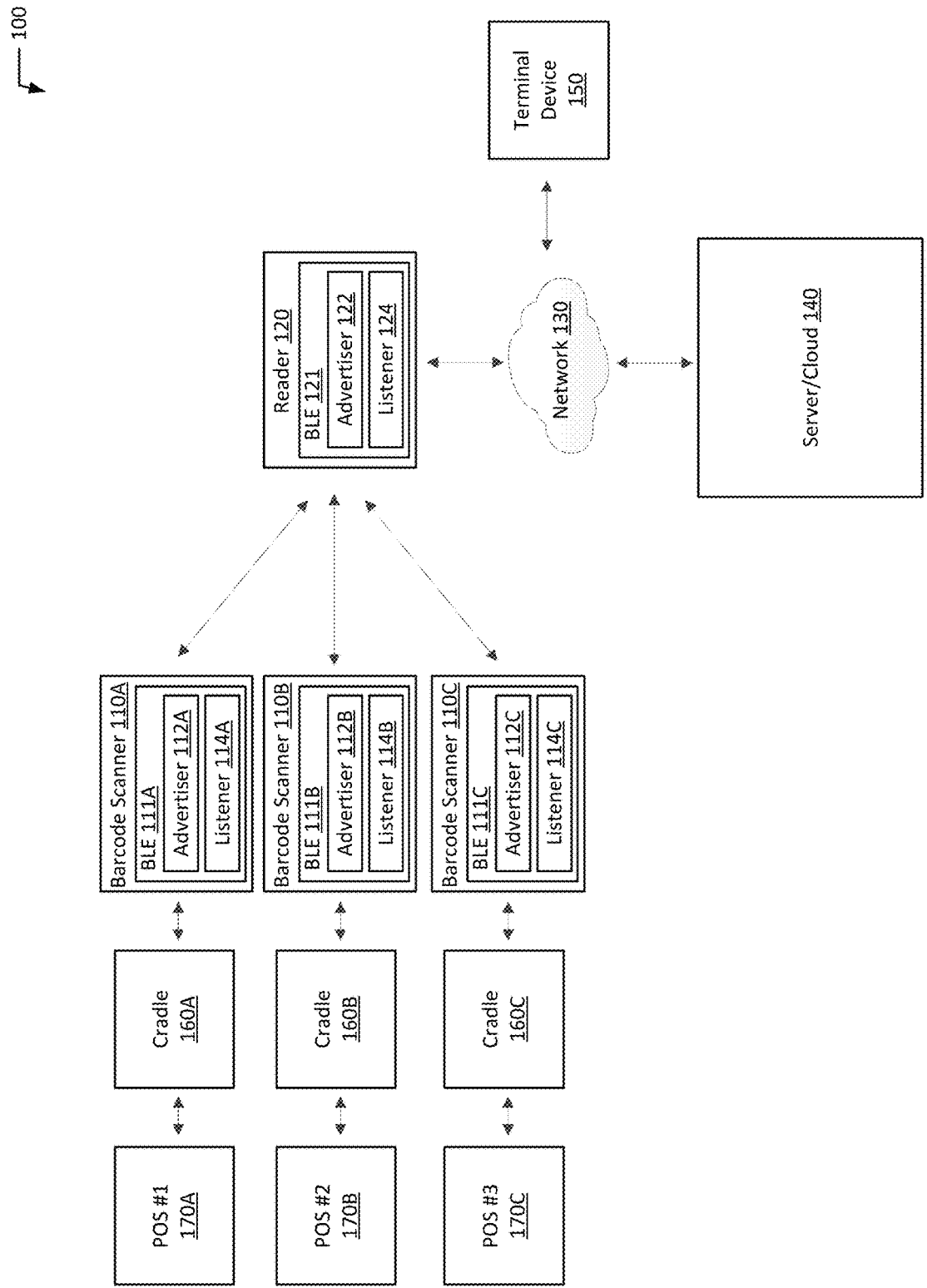
FIG. 1 is a block diagram of an example system for tracking barcode scanners using a BLE beacon receiver (listener) contained within a reader according to an example of the present disclosure.

FIG. 1 depicts a high-level component diagram of an example system 100 for tracking barcode scanners using a BLE beacon receiver (listener) contained within a reader. In some examples, the system 100 may include one or more barcode scanners 110A-110C and a reader 120.

Each of the barcode scanners 110A-110C may include a BLE device 111A-111C. Each of the BLE devices 111A-111C may include an advertiser 112A-112C and a listener 114A-114C. The advertiser 112A-112C may be configured to broadcast a beacon signal (that can be detected by a BLE device 121 of the reader 120), and the listener 114A-114C may be configured to detect a beacon signal from another device (e.g., from the reader 120). In some examples, each of the barcode scanners 110A-110C may use, as a power source, a battery or an alternative power supply (e.g., super capacitor), which may be disposed within the barcode scanners 110A-110C.

The reader 120 may also include a BLE device 121. The BLE device 121 of the reader 120 may include an advertiser 122 and a listener 124. The advertiser 122 of the reader 120 may be configured to broadcast a beacon signal (that can be detected by the BLE devices 111A-111C of the barcode scanners 110A-110C), and the listener 124 of the reader 120 may be configured to detect a beacon signal from another device (e.g., the barcode scanners 110A-110C).

In some examples, the reader 120 may be a radio frequency identification (RFID) reader, an electronic article surveillance (EAS) reader, or an RFID EAS reader. In other examples, the reader 120 may be any other suitable device. In some examples, the reader 120 may be placed at an entrance and/or exit of a store, a facility (e.g., a hospital), or a commercial premise (e.g., a warehouse or depot). In other examples, the reader 120 may be placed at any other suitable place.

In some examples, the system 100 may further include a server/cloud 140 and a terminal device 150. The reader 120, server/cloud 140, and/or the terminal device 150 may be in communication with each other through a network 130. Examples of the network 130 may include the Internet, a local area network (LAN), a wide area network (WAN), or a combination thereof. In some examples, the terminal device 150 may be a mobile device (e.g., smart phone, beeper, tablet) carried by a user (e.g., a security officer). In other examples, the terminal device 150 may be any other suitable type of device that can be monitored by the user (e.g., a display device).

In some examples, the system 100 may also include one or more cradles 160A-160C and one or more POS systems 170A-170C. The one or more cradles 160A-160C may be configured to receive the barcode scanners 110A-110C. In some examples, each of the one or more cradles 160A-160C may be configured to be paired with the one or more barcode scanners 110A-110C. For example, the cradle 160A may be paired with the barcode scanner 110A, the cradle 160B may be paired with the barcode scanner 110B, and the cradle 160C may be paired with the barcode scanner 110C.

In some examples, the one or more POS systems 170A-170C may be assigned to a lane number of a check out area of a store, a facility (e.g., a hospital), or a commercial premise (e.g., a warehouse or depot). For example, the POS system 170A may be assigned to a lane number 1, the POS system 170B may be assigned to a lane number 2, and the POS system 170C may be assigned to a lane number 3. In some examples, each of the one or more cradles 160A-160C may be configured to be paired with the POS system 170A-170C. For example, the cradle 160A may be paired with the POS system 170A, the cradle 160B may be paired with the POS system 170B, and the cradle 160C may be paired with the POS system 170C.

In some examples, each of the one or more cradles 160A-160C may be configured to transmit the lane number received from the POS system 170A-170C to the corresponding barcode scanner 110A-110C, for example, when or after the cradle 160A-160C is paired (e.g., via a Bluetooth connection) with the corresponding barcode scanner 110A-110C. The cradle 160A may transmit the lane number (#1) of the POS system 170A to the barcode scanner 110A, the cradle 160B may transmit the lane number (#2) of the POS system 170B to the barcode scanner 110B, and the cradle 160C may transmit the lane number (#3) of the POS system 170C to the barcode scanner 110C. In some examples, the barcode scanner 110A-110C may be paired with the cradle 160A-160C (e.g., via Bluetooth) when the barcode scanner 110A-110C is connected with (e.g., plugged into) the cradle 160A-160C.

Figure 2A:
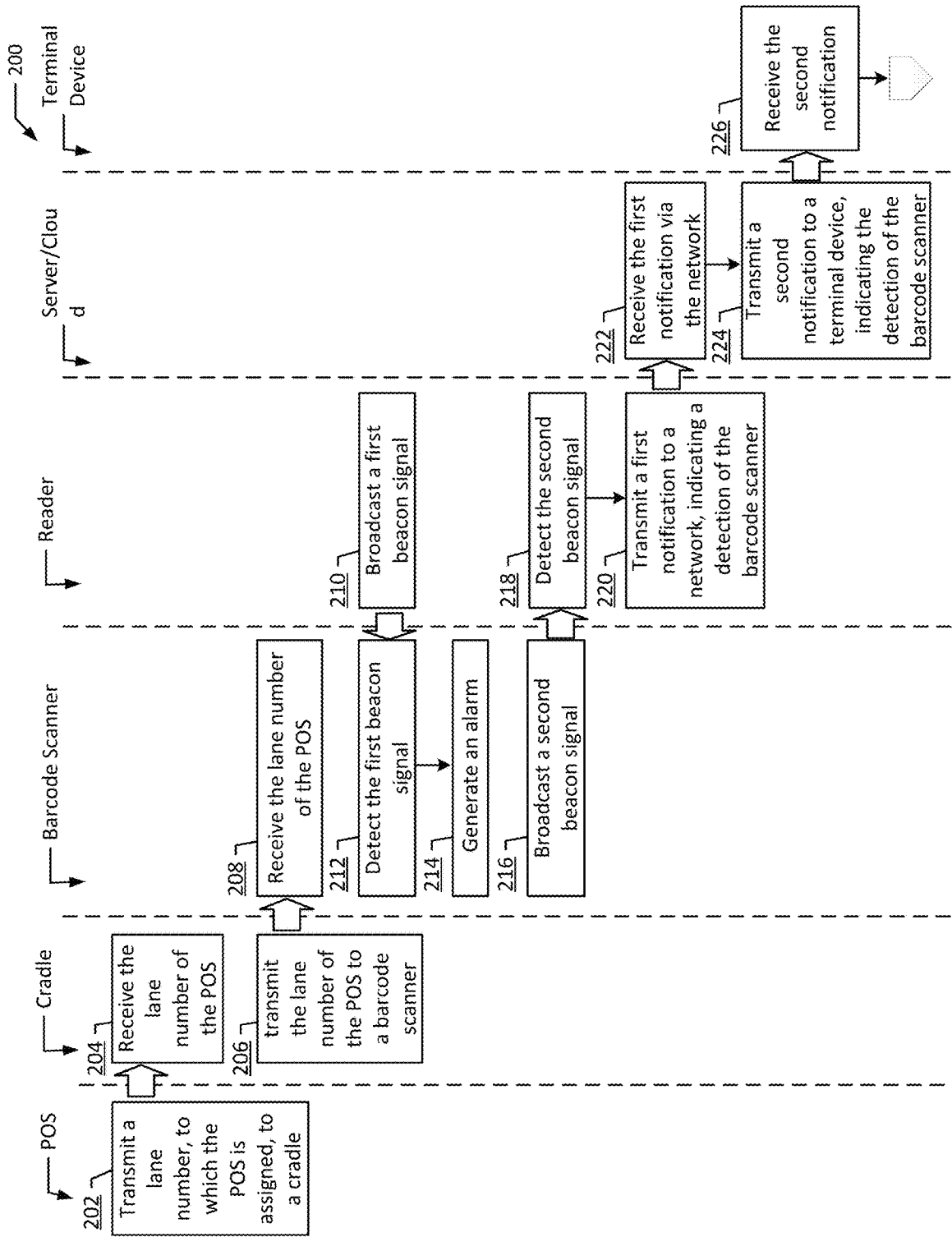
FIGS. 2A and 2B are flow diagrams illustrating example methods of tracking barcode scanners using a BLE beacon receiver (listener) contained within a reader according to an example of the present disclosure.
Figure 2B:
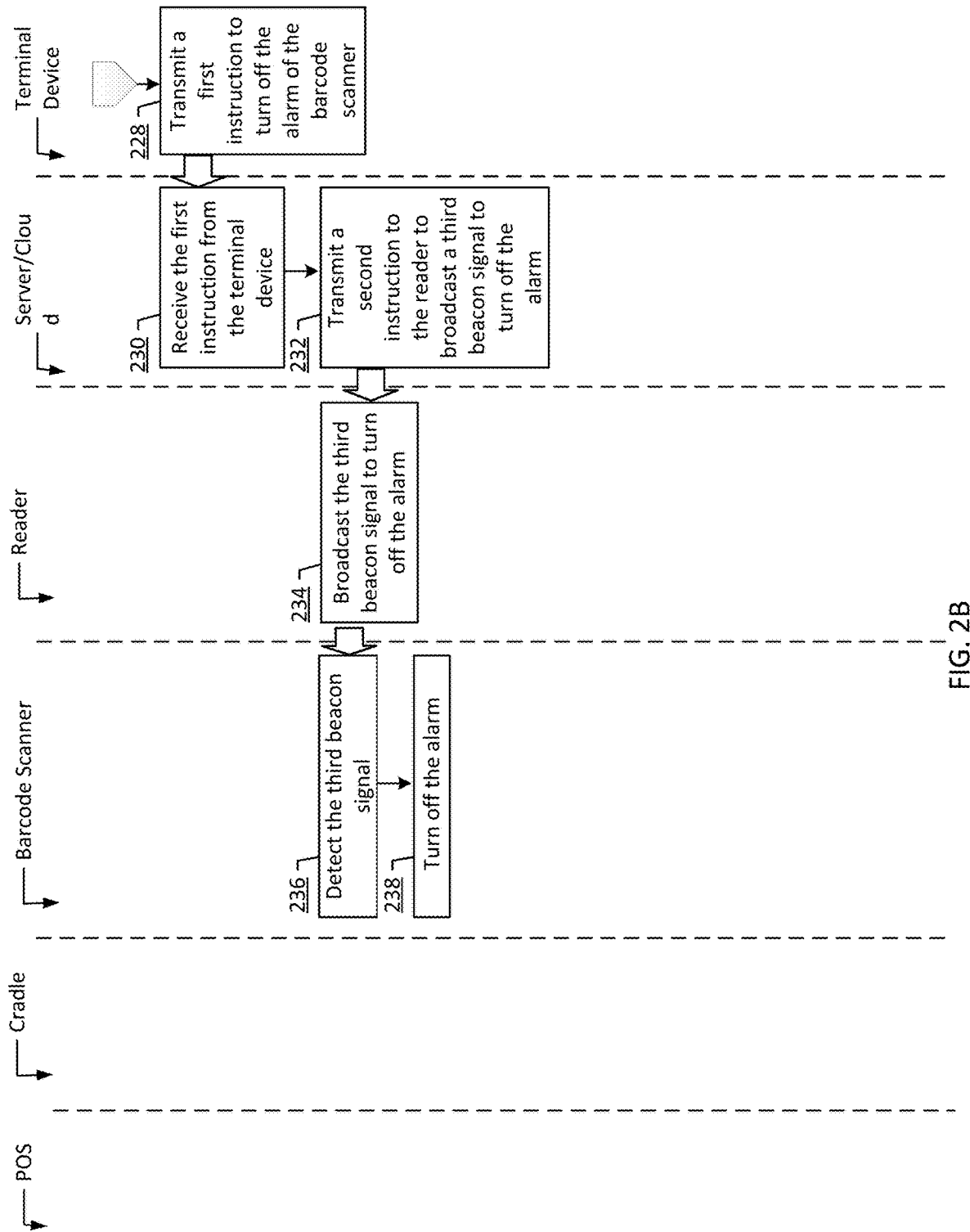

FIGS. 2A and 2B show a flowchart of an example method 200 for tracking barcode scanners using a BLE beacon receiver (listener) contained within a reader according to an example of the present disclosure. Although the example method 200 is described with reference to the flowchart illustrated in FIGS. 2A and 2B, it will be appreciated that many other methods of performing the acts associated with the method may be used. For example, the order of some of the blocks may be changed, certain blocks may be combined with other blocks, and some of the blocks described are optional.

In the illustrated example, a POS system may transmit a lane number, to which the POS system is assigned, to a cradle (block 202). In some examples, each of the POS systems 170A-170C may be assigned to a lane number. For example, the POS system 170A may be assigned to a lane number 1, the POS system 170B may be assigned to a lane number 2, and the POS system 170C may be assigned to a lane number 3. The POS system 170A may transmit the lane number 1 to the cradle 160A. In some examples, the POS system may transmit its lane number to a cradle when/after the cradle is paired with the POS system (e.g., when/after the cradle is connected to the POS system in a wired or wireless manner). Then, the cradle may receive the lane number of the POS system (block 204). For example, the cradle 160A may receive the lane number (#1) of the POS system 170A.

The cradle may transmit the lane number of the POS system to a barcode scanner (block 206). For example, the cradle 160A may transmit the lane number (#1) of the POS system 170A to the barcode scanner 110A. The cradle may transmit the lane number of the POS system to the barcode scanner when/after the barcode scanner is paired with the cradle in a wired/wireless manner. The barcode scanner may receive the lane number of the POS (block 208). For example, the barcode scanner 110A may receive the lane number (#1) of the POS system 170A from the cradle 160A.

A reader may broadcast a first beacon signal (block 210). For example, the advertiser 122 of the reader 120 may broadcast a first beacon signal. In some examples, the reader 120 may broadcast the first beacon signal periodically, for example, at a predetermined frequency (e.g., 2, 3, 5, 10 times every second). In some examples, the first beacon signal of the reader 120 can be detected within a predetermined detectable distance from the BLE device 121 of the reader 120. In some examples, the detectable distance of the first beacon signal may be in a range of about 10 feet to about 50 feet. In other examples, the detectable distance of the first beacon signal may have any other suitable range (e.g., lower than 10 feet or greater than 50 feet).

A barcode scanner may detect the first beacon signal (block 212). For example, the listener 114A of the barcode scanner 110A may detect the first beacon signal broadcast from the reader 120. The barcode scanner 110A may detect the first beacon signal from the reader 120 when the barcode scanner 110A is brought within the detectable distance of the first beacon signal from the BLE device 121 of the reader 120. The detection of the first beacon signal by the barcode scanner 110A may indicate that the barcode scanner 110A may be about to be carried away from the store/facility/premise to which the barcode scanner belongs. The first beacon signal may include a unique identifier, which may indicate information about the reader 120. That is, the first beacon signal from the reader 120 may be different from other beacon signals from other (BLE) devices, and this may be differentiated by the barcode scanners 110A-110C.

Then, the barcode scanner may generate an alarm (block 214). For example, in response to detecting the first beacon signal from the reader 120, the barcode scanner 110A may generate an alarm. Examples of the alarm may include an audible sound (e.g., a beep), emission of light, vibration, and a combination thereof.

In some examples, the barcode scanner may broadcast a second beacon signal (block 216). For example, the advertiser 112A of the barcode scanner 110A may broadcast a second beacon signal. In some examples, the barcode scanner may broadcast a second beacon signal in response to detecting the first beacon signal from the reader 120. In other examples, the barcode scanner may broadcast a second beacon signal periodically, for example, at a predetermined frequency (e.g., 2, 3, 5, 10 times every second) regardless of the detection of the first beacon signal.

In some examples, the second beacon signal from the barcode scanner may include information about the barcode scanner. Examples of information of the second beacon signal may include at least one of a serial number of the barcode scanner and a lane number to which the barcode scanner (or the corresponding POS system) is assigned. The serial number of the barcode scanner may be any unique identifier (e.g., number, QR code) of the barcode scanner that may differentiate the barcode scanner from another barcode scanner. The lane number may be the lane number that the barcode scanner received from a corresponding cradle.

In some examples, the second beacon signal of the barcode scanner can be detected within a predetermined detectable distance from the BLE device of the barcode scanner. In some examples, the detectable distance of the second beacon signal may be in a range of about 10 feet to about 50 feet. In other examples, the detectable distance of the second beacon signal may have any other suitable range (e.g., lower than 10 feet or greater than 50 feet).

The reader may detect the second beacon signal (block 218). For example, the listener 124 of the reader 120 may detect the second beacon signal broadcast from the barcode scanner 110A. The reader 120 may detect the second beacon signal from the barcode scanner 110A when the barcode scanner 110A is brought within the detectable distance of the second beacon signal from the BLE device 111A of the barcode scanner 110A. The detection of the second beacon signal from the barcode scanner 110A may indicate that the barcode scanner 110A may be about to be carried away from the premises/stores/facilities to which the barcode scanner belongs. In some examples, in response to detecting the second beacon signal, the reader 120 may be configured to transmit information about the lane number of the barcode scanner to the network 130 (and ultimately to the server/cloud 140).

The reader may transmit a first notification to a network, indicating a detection of the barcode scanner (block 220). For example, in response to detecting the second beacon signal, the reader 120 may transmit a first notification to a network 130, indicating a detection of the barcode scanner 110A. Then, a server/cloud may receive the first notification via the network (block 222). For example, the server/cloud 140 may receive the first notification from the reader 120 via the network 130.

Then, the server/cloud may transmit a second notification to a terminal device, indicating the detection of the barcode scanner (block 224). For example, in response to receiving the first notification, the server/cloud 140 may transmit a second notification to a terminal device 150 (for example, via the network 130), indicating the detection of the barcode scanner 110A. In some examples, the server/cloud 140 may generate the second notification based on the first notification. In other examples, the server/cloud 140 may simply deliver the first notification from the reader 120 to the terminal device 150. In this case, the second notification may be the same as the first notification. In some examples, the second notification may be a text message.

In some examples, the first and/or second notification may include information about the serial number of the barcode scanner 110A and/or the lane number to which the barcode scanner 110A is assigned. In other examples, the information about the serial/lane number of the barcode scanner 110A may be transmitted to the server/cloud 140 and the terminal device 150 through a separate notification/message.

The terminal device may receive the second notification (block 226). For example, the terminal device 150 may receive the second notification from the server/cloud 140 via the network 130. In this way, the user (e.g., security officer) of the terminal device 150, who may be at or near the entrance and/or exit of a store, a facility (e.g., a hospital), or a commercial premise (e.g., a warehouse or depot), can be notified that the barcode scanner 110A is about to be carried away from the store/facility/premise to which the barcode scanner 110A belongs.

Then, the terminal device may transmit a first instruction to turn off the alarm of the barcode scanner (block 228). For example, the terminal device 150 may transmit a first instruction to the server/cloud 140 to turn off the alarm of the barcode scanner 110A. In some examples, in response to receiving the second notification, the terminal device 150 may provide an option (for example, through an application running on the terminal device 150) for a user input (e.g., depressing, clicking, or touching, etc. a button) for turning off the alarm of the barcode scanner 110A. Once the user input is received, the first instruction may be generated and/or transmitted to the server/cloud 140.

In some examples, the terminal device 150 may also provide the information about the serial number of the barcode scanner 110A and/or the lane number (e.g., #1) to which the barcode scanner 110A is assigned to the user (via a display of the terminal device 150). In this way, the user (e.g., security officer) may be able to learn about the lane number to which the barcode scanner is assigned quickly so that the barcode scanner can be returned to its original location (e.g., corresponding lane or cradle). This may also allow the user to determine whether it is a false alarm quickly by checking the lane/cradle to which the barcode scanner is assigned.

The server/cloud may receive the first instruction from the terminal device (block 230). For example, the server/cloud 140 may receive the first instruction from the terminal device 150. Then, the server/cloud may transmit a second instruction to the reader to broadcast a third beacon signal to turn off the alarm (block 232). In some examples, the server/cloud 140 may generate the second instruction based on the first instruction. In other examples, the server/cloud 140 may simply deliver the first instruction from the terminal device 150 to the reader 120, and the second instruction is the first instruction.

Then, the reader may broadcast a third beacon signal to turn off the alarm (block 234). For example, in response to receiving the second instruction, the reader 120 may broadcast, via the advertiser 122, a third beacon signal to turn off the alarm of the barcode scanner 110A. The third beacon signal may include a unique identifier, which may indicate information about the reader 120. That is, the third beacon signal from the reader may be different from other beacon signals from other (BLE) devices, and this may be differentiated by the barcode scanners 110A-110C. The third beacon signal may be also different from the first beacon signal. For example, the third beacon signal may include an instruction to turn off the alarm while the first beacon signal may not include this instruction.

In some examples, the third beacon signal of the reader 120 can be detected within a predetermined detectable distance from the BLE device 121 of the reader 120. In some examples, the detectable distance of the third beacon signal may be in a range of about 10 feet to about 50 feet. In other examples, the detectable distance of the third beacon signal may have any other suitable range (e.g., lower than 10 feet or greater than 50 feet).

The barcode scanner may detect the third beacon signal (block 236). For example, the barcode scanner 110A may detect the third beacon signal from the reader 120. Then, the barcode scanner may turn off the alarm (block 238). For example, in response to detecting the third beacon signal, the barcode scanner 110A may turn off the alarm (that has been generated since the detection of the first beacon signal).

Although it has been described above that the reader 120 and the terminal device 150 communicate with each other via the server/cloud 140, the reader 120 and the terminal device 150 may communicate with each other directly without having the server/cloud 140 therebetween. In this case, the first notification/instruction may be transmitted directly to the terminal device 150/reader 120 from the reader 120/terminal device 150. In some examples, the cradle 160A-160C may be replaced with or may refer to any suitable base station that may communicate with the barcode scanner 110A-C and/or the POS system 170A-170C.

In some examples, the beacon signal (e.g., first, second, third beacon signals) from the barcode scanners 110A-110C and/or the reader 120 may include a data packet. In other examples, the beacon signal (e.g., first, second, third beacon signals) from the barcode scanners 110A-110C and/or the reader 120 may have any other suitable form (e.g., radio, ultrasonic, optical, laser).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined by the appended claims including any amendments made during the pendency of this application and all equivalents of those claims as issued.

Moreover, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention is claimed as follows:

1. A system comprising:
 a reader comprising a first Bluetooth Low Energy (BLE) device, the first BLE device having a first advertiser and a first listener; and a barcode scanner comprising a second BLE device, the second BLE device having a second advertiser and a second listener, wherein the first advertiser of the reader is configured to broadcast a first beacon signal, the barcode scanner is configured to:
- detect, by the second listener, the first beacon signal, and
- in response to detecting the first beacon signal, generate an alarm, and the second advertiser of the barcode scanner is configured to broadcast a second beacon signal, the second beacon signal including information about the barcode scanner, the information about the barcode scanner comprising at least one of a serial number of the barcode scanner and a lane number to which the barcode scanner is assigned.

2. The system of claim 1, wherein the second advertiser of the barcode scanner is configured to broadcast the second beacon signal in response to detecting the first beacon signal from the first advertiser of the reader.

3. The system of claim 1, wherein the reader is in communication with a network and is configured to:
- detect, by the first listener, the second beacon signal; and
- in response to detecting the second beacon signal, transmit a first notification indicative of a detection of the barcode scanner to the network.

4. The system of claim 3, wherein
- the first notification is transmitted to a server system or a cloud system via the network, and
- in response to receiving the first notification, the server system or the cloud system is configured to transmit a second notification indicative of a detection of the barcode scanner to a terminal device.

5. The system of claim 4, wherein the terminal device comprises a mobile device.

6. The system of claim 4, wherein the server system or the cloud system is configured to:
- receive a first instruction from the terminal device to turn off the alarm of the barcode scanner; and
- in response to receiving the first instruction, transmit a second instruction to the reader to broadcast, by the first advertiser, a third beacon signal to turn off the alarm.

7. The system of claim 6, wherein the barcode scanner is configured to:
- detect, by the second listener, the third beacon signal; and
- in response to detecting the third beacon signal, turn off the alarm.

8. The system of claim 1, further comprising a cradle configured to receive and pair with the barcode scanner.

9. The system of claim 8, wherein the cradle is configured to:
- receive the lane number from a point of sale (POS) system that is assigned to the lane number;
- transmit the lane number received from the POS system to the barcode scanner.

10. The system of claim 9, wherein the cradle is configured to transmit the lane number received from the POS system to the barcode scanner in response to being paired with the barcode scanner via a Bluetooth connection.

11. The system of claim 1, wherein, in response to detecting the second beacon signal, the reader is configured to transmit information about the lane number of the barcode scanner to the network.

12. The system of claim 1, wherein a detectable distance of the first beacon signal is in a range of 10 feet to 50 feet from the location of the first BLE device of the reader.

13. The system of claim 1, wherein the reader is a radio frequency identification (RFID) reader, an electronic article surveillance (EAS) reader, or an RFID EAS reader.

14. A method comprising:
- broadcasting, by a first advertiser of a reader, a first beacon signal, the reader comprising a first Bluetooth Low Energy (BLE) device having the first advertiser and a first listener;
- detecting, by a second listener of a barcode scanner, the first beacon signal, the barcode scanner comprising a second BLE device having a second advertiser and the second listener;
- in response to detecting the first beacon signal, generating, by the barcode scanner, an alarm; and
- broadcasting, by the second advertiser of the barcode scanner, a second beacon signal, the second beacon signal including information about the barcode scanner, wherein the information about the barcode scanner comprises at least one of a serial number of the barcode scanner and a lane number to which the barcode scanner is assigned.

15. The method of claim 14, wherein the reader is in communication with a network, wherein the method further comprises:
- detecting, by the first listener of the reader, the second beacon signal;
- in response to detecting the second beacon signal, transmitting, by the reader, a first notification indicative of a detection of the barcode scanner to a server system or a cloud system via a network; and
- in response to receiving the first notification, transmitting, by the server system or the cloud system, a second notification indicative of a detection of the barcode scanner to a terminal device.

16. The method of claim 14, further comprising
- receiving, by a cradle, the lane number from a point of sale (POS) system that is assigned to the lane number; and
- transmitting, by the cradle, the lane number received from the POS system to the barcode scanner.

* * * * *